(12) United States Patent
Lemery

(10) Patent No.: US 11,460,070 B2
(45) Date of Patent: Oct. 4, 2022

(54) SELF-REPAIR BEARING AND METHODS

(71) Applicant: The Boeing Company, Chicago, IL (US)

(72) Inventor: Steven G. Lemery, Duvall, WA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 16/733,800

(22) Filed: Jan. 3, 2020

(65) Prior Publication Data

US 2021/0207650 A1  Jul. 8, 2021

(51) Int. Cl.
| | |
|---|---|
| *F16C 17/24* | (2006.01) |
| *F16C 33/10* | (2006.01) |
| *F16C 33/24* | (2006.01) |
| *F16C 33/12* | (2006.01) |

(52) U.S. Cl.
CPC ........ *F16C 17/246* (2013.01); *F16C 33/1095* (2013.01); *F16C 33/121* (2013.01); *F16C 33/24* (2013.01); *F16C 2204/34* (2013.01); *F16C 2240/64* (2013.01)

(58) Field of Classification Search
CPC ........ F16C 17/02; F16C 17/246; F16C 33/06; F16C 33/1095; F16C 33/121; F16C 33/128; F16C 33/145; F16C 33/24; F16C 33/26

See application file for complete search history.

(56) References Cited

U.S. PATENT DOCUMENTS

| | | |
|---|---|---|
| 4,229,309 A | 10/1980 | Cheng et al. |
| 6,423,669 B1 | 7/2002 | Alexandrov et al. |
| 2006/0257059 A1* | 11/2006 | Kubota ................ F16C 33/103 384/293 |
| 2013/0058605 A1* | 3/2013 | Hirayama ............ F16C 33/121 384/397 |
| 2013/0274157 A1 | 10/2013 | Zozulya et al. |
| 2021/0269146 A1* | 9/2021 | Coombe ................ B64C 25/08 |

FOREIGN PATENT DOCUMENTS

DE           4214877 A1  *  11/1993  ............. F16C 33/12

OTHER PUBLICATIONS

Machine Translation of DE 4214877. (Year: 1993).*
Shpenkov, G., Friction Surface Phenomena, 1995, Tribology Series, 29, Elsevier Science B.V.
Hsu et al., Boundary Lubrication and Boundary Lubricating Films, 2001, pp. 1-38, CRC Press LLC.
X. Qi et al., Comparative tribological properties of magnesium hexasilicate and serpentine powder as lubricating oil additives under Hight temperature, 2012, Tribology International 49, pp. 53-57, Elsevier Ltd.

* cited by examiner

*Primary Examiner* — Alan B Waits
(74) *Attorney, Agent, or Firm* — Kunzler Bean & Adamson

(57) ABSTRACT

Disclosed herein a bearing that comprises a base, made of a metallic base material. The base comprises a cylindrical outer surface, a cylindrical inner surface that is opposite the cylindrical outer surface, and a central channel defined by the cylindrical inner surface and extending through the base. The bearing also comprises a selective transfer material embedded in the base. The selective transfer material is different than the metallic base material and is configured to release from the base in response to frictionally-induced pressure acting on the base.

20 Claims, 14 Drawing Sheets

SELF-REPAIR BEARING AND METHODS

FIELD

This disclosure relates generally to bearings, and more particularly to reducing wear of bearings during use.

BACKGROUND

A frictional interface is defined by a surface of a bearing and a surface of a part, such as a shaft, in slidable frictional engagement with the surface of the bearing. Bearings are configured to reduce the friction between moving parts. However, during use of the part (e.g., as the shaft rotates relative to the bearing), frictional engagement between the surfaces of the frictional interface may cause the base materials of the bearing and/or the part to break away from the surfaces. This loss of base material from the surfaces, which is otherwise known as wear, roughens or makes uneven the surfaces. Wear results in an increase in friction between the surfaces of the frictional interface and a drop in the friction-reducing efficiency of the bearing, which leads to a corresponding drop in the performance of a bearing. Bearings suffering from low performance may require frequent replacement, service/repair, or maintenance, which can lead to economic losses, inconveniences, and delays.

SUMMARY

The subject matter of the present application provides examples of a bearing and corresponding methods that overcome the above-discussed shortcomings of prior art techniques. Accordingly, the subject matter of the present application has been developed in response to the present state of the art, and in particular, in response to shortcomings of conventional bearings that are used to reduce friction between moving parts.

Disclosed herein is a bearing that comprises a base, made of a metallic base material. The base comprises a cylindrical outer surface, a cylindrical inner surface that is opposite the cylindrical outer surface, and a central channel defined by the cylindrical inner surface and extending through the base. The bearing also comprises a selective transfer material embedded in the base. The selective transfer material is different than the metallic base material and is configured to release from the base in response to frictionally-induced pressure acting on the base. The preceding subject matter of this paragraph characterizes example 1 of the present disclosure.

The metallic base material comprises a bronze alloy. The preceding subject matter of this paragraph characterizes example 2 of the present disclosure, wherein example 2 also includes the subject matter according to example 1, above.

The selective transfer material is selected from the group consisting of tin, zinc, copper, iron, lead, palladium, cobalt, titanium dioxide, copper oxide, iron oxide black ($Fe_3O_4$), zinc oxide, aluminum oxide, zinc dialkyl dithiophosphate (ZDDP), molybdenum disulfide, graphene, $Si_3N_4$, AlN, $CaCO_3$, MgO, and serpentine minerals. The preceding subject matter of this paragraph characterizes example 3 of the present disclosure, wherein example 3 also includes the subject matter according to any one of examples 1-2, above.

The serpentine minerals comprise $Mg_6Si_4O_{10}(OH)_8$, $Al_2O_3$, CaO, and $Fe_2O_3$. The preceding subject matter of this paragraph characterizes example 4 of the present disclosure, wherein example 4 also includes the subject matter according to example 3, above.

The selective transfer material comprises particles each having a maximum dimension that is less than or equal to 40 nanometers. The preceding subject matter of this paragraph characterizes example 5 of the present disclosure, wherein example 5 also includes the subject matter according to any one of examples 1-4, above.

The selective transfer material has a percent composition between 1% and 10% of a combined mass of the base and the selective transfer material. The preceding subject matter of this paragraph characterizes example 6 of the present disclosure, wherein example 6 also includes the subject matter according to any one of examples 1-5, above.

The bearing further comprises one of an interior layer directly coupled to the cylindrical inner surface and interiorly covering the cylindrical inner surface and the selective transfer material, or an exterior layer directly coupled to the cylindrical outer surface and exteriorly covering the cylindrical outer surface and the selective transfer material. The preceding subject matter of this paragraph characterizes example 7 of the present disclosure, wherein example 7 also includes the subject matter according to any one of examples 1-6, above.

The interior layer and the exterior layer are made of copper. The preceding subject matter of this paragraph characterizes example 8 of the present disclosure, wherein example 8 also includes the subject matter according to example 7, above.

Each one of the interior layer and the exterior layer has a thickness less than or equal to 0.03 millimeters. The preceding subject matter of this paragraph characterizes example 9 of the present disclosure, wherein example 9 also includes the subject matter according to any one of examples 7-8, above.

The base further comprises one of at least one recess formed in the cylindrical outer surface of the base wherein the selective transfer material is contained within the at least one recess formed in the cylindrical outer surface, or at least one recess formed in the cylindrical inner surface of the base, wherein the selective transfer material is contained within the at least one recess formed in the cylindrical inner surface. The preceding subject matter of this paragraph characterizes example 10 of the present disclosure, wherein example 10 also includes the subject matter according to any one of examples 1-9, above.

The at least one recess formed in the cylindrical outer surface forms a continuous ring that is perpendicular to a central axis of the central channel. The at least one recess formed in the cylindrical inner surface forms a continuous ring that is perpendicular to the central axis of the central channel. The preceding subject matter of this paragraph characterizes example 11 of the present disclosure, wherein example 11 also includes the subject matter according to example 10, above.

The at least one recess formed in the cylindrical outer surface is non-continuous and entirely surrounded by the cylindrical outer surface. The at least one recess formed in the cylindrical inner surface is non-continuous and entirely surrounded by the cylindrical inner surface. The preceding subject matter of this paragraph characterizes example 12 of the present disclosure, wherein example 12 also includes the subject matter according to example 10, above.

The base comprises one of a plurality of recesses formed in the cylindrical outer surface of the base or a plurality of recesses formed in the cylindrical inner surface of the base. Each one of the plurality of recesses formed in the cylindrical outer surface passes through and is angled relative to at least another one of the plurality of recesses formed in the cylindrical outer surface. Each one of the plurality of recesses formed in the cylindrical inner surface passes through and is angled relative to at least another one of the plurality of recesses formed in the cylindrical inner surface. The preceding subject matter of this paragraph characterizes example 13 of the present disclosure, wherein example 13 also includes the subject matter according to example 10, above.

The at least one recess formed in the cylindrical outer surface forms a helix. The at least one recess formed in the cylindrical inner surface forms a helix. The preceding subject matter of this paragraph characterizes example 14 of the present disclosure, wherein example 14 also includes the subject matter according to example 10, above.

The selective transfer material is uniformly distributed throughout the base. The preceding subject matter of this paragraph characterizes example 15 of the present disclosure, wherein example 15 also includes the subject matter according to any one of examples 1-9, above.

Further disclosed herein is a method of making a bearing. The method comprises forming a base made of a metallic base material and comprising a cylindrical outer surface, a cylindrical inner surface that is opposite the cylindrical outer surface, and a central channel that is defined by the cylindrical inner surface and extends through the base. The method also comprises embedding a selective transfer material into the base, the selective transfer material is selected from the group consisting of tin, zinc, copper, iron, lead, palladium, cobalt, titanium dioxide, copper oxide, iron oxide black (Fe3O4), zinc oxide, aluminum oxide, zinc dialkyl dithiophosphate (ZDDP), molybdenum disulfide, graphene, Si3N4, AlN, CaCO3, MgO, and serpentine minerals. The preceding subject matter of this paragraph characterizes example 16 of the present disclosure.

The step of forming the base comprises forming at least one recess into the cylindrical outer surface of the base or the cylindrical inner surface of the base. The step of embedding the selective transfer material comprises filling the at least one recess with the selective transfer material. The preceding subject matter of this paragraph characterizes example 17 of the present disclosure, wherein example 17 also includes the subject matter according to example 16, above.

The step of forming the base comprises compressing and sintering a first powder made of the metallic base material. The step of embedding the selective transfer material comprises combining a second powder, made of the selective transfer material, to the first powder and compressing and sintering the second powder with the first powder. The preceding subject matter of this paragraph characterizes example 18 of the present disclosure, wherein example 18 also includes the subject matter according to example 16, above.

Additionally disclosed herein is a method of reducing wear in a bearing joint. The method comprises rotating a first component of the bearing joint relative to a second component of the bearing joint. The method also comprises releasing a selective transfer material, embedded in a base of a bearing interposed between the first component and the second component and fixed relative to the first component, from the bearing. The method further comprises bonding the selective transfer material, released from the bearing, to the first component. The preceding subject matter of this paragraph characterizes example 19 of the present disclosure.

The method further comprises bonding the selective transfer material, released the bearing, to the base of the bearing. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a bearing that promotes the transfer of selective transfer material from the bearing to one or more surfaces defining a frictional interface of a bearing joint. The frictional interface is defined by a surface of the bearing and a surface of a part, such as a shaft, in slidable frictional engagement with the surface of the bearing. During use of the bearing joint (e.g., as the shaft rotates relative to the bearing), frictional engagement between the surfaces of the frictional interface may cause the base materials of the bearing and/or the part to break away from the surfaces. This loss of base material from the surfaces roughens or makes uneven the surfaces, which results in an increase in friction between the surfaces of the frictional interface and a drop in the efficiency of the bearing joint. The selective transfer material transferred from the bearing helps to fill the voids in the surfaces of the frictional interface, left behind by the breaking away of the base materials from the surfaces, thus maintaining a smoothness in the surfaces and a desired friction-reducing efficiency of the bearing joint. As more base material breaks away or the selective transfer material in the voids breaks away, the corresponding voids left behind are then filled by additional selective transfer material released from the bearing after the voids are formed. In this manner, the bearing promotes self-repair of the bearing joint.

Figure 1:
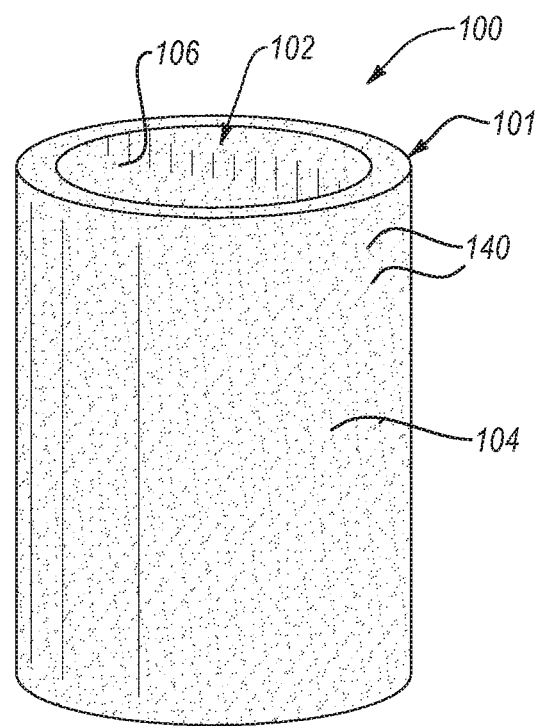
FIG. 1 is a perspective view of a bearing, according to one or more examples of the present disclosure.

Referring to FIG. 1, according to one example, a bearing 100 of the present disclosure is shown. In this example, the bearing 100 is configured to function as a plain bearing or bushing. In other words, the bearing 100 of FIG. 1 has no moving parts. The bearing 100 includes a base 101 that is made of a metallic base material. According to some implementations, the metallic base material includes one or a combination of a copper alloy (e.g., bronze or brass), or any of various transition metals and alloys. In some examples, rather than the base 101 being made of a metallic base material, the base 101 can be made of a non-metallic base material, such as a polymer or a ceramic.

The base 101 has a hollow cylindrical shape. Accordingly, the base 101 includes a cylindrical inner surface 106 that defines a central channel 102 of the base 101. The base 101 also includes a cylindrical outer surface 104 that is opposite the cylindrical inner surface 106. The distance between the cylindrical outer surface 104 and the cylindrical inner surface 106 defines a thickness of the base 101 (e.g., the thickness of the sidewall of the base 101). Generally, the thickness of the base 101 is significantly less than an entire length or an entire width of the base 101, such that the base 101 has a thin-walled construction. The base 101 need not be perfectly cylindrical to be considered to have a hollow cylindrical shape. Rather, to accommodate for deviations or variations in the shape of the base 101, such as due to tolerances, measurement error, measurement accuracy limitations, and other factors known to those skilled in the art, as used herein, a shape need only be substantially cylindrical (e.g., within 5% of perfectly cylindrical or cylindrical enough to provide the effect the cylindrical nature of the base 101 was intended to provide) to be considered to fall within the definition of cylindrical.

Figure 23:
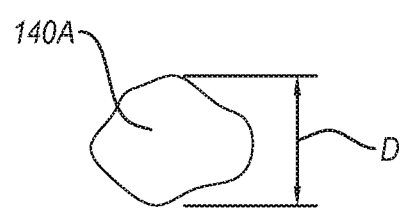
FIG. 23 is a side view of a particle made of a selective transfer material.

The bearing 100 also includes a selective transfer material 140 embedded in the base 101. The selective transfer material 140 is different than the metallic base material and is configured to release from the base 101 in response to frictionally-induced pressure acting on the base 101. In some examples, the selective transfer material 140 is one or more of a transition metal, salts, or ceramics. According to certain examples, the selective transfer material 140 is one or more of tin, zinc, copper, iron, lead, palladium, cobalt, titanium dioxide, copper oxide, iron oxide black ($Fe_3O_4$), zinc oxide, aluminum oxide, zinc dialkyl dithiophosphate (ZDDP), molybdenum disulfide, graphene, $Si_3N_4$, AlN, $CaCO_3$, MgO, and serpentine minerals. The serpentine minerals include $Mg_6Si_4O_{10}(OH)_8$, $Al_2O_3$, CaO, and $Fe_2O_3$ in some examples. Referring to FIG. 23, the selective transfer material 140 is made of particles 140A each having a maximum dimension (D) that is less than or equal to 40 nanometers in some examples.

The total amount of selective transfer material 140 embedded in the base 101 is a relatively small percentage of the total amount of the metallic base material in the base 101. Such a configuration helps ensure the selective transfer material does not diminish the role of the metallic base material to provide the primary friction-reducing functionality of the bearing 100. According to one example, the selective transfer material 140 has a percent composition between 1% and 10% of a combined mass of the base 101 and the selective transfer material 140. In certain examples, the selective transfer material 140 has a percent composition between 4% and 7% of a combined mass of the base 101 and the selective transfer material 140.

Figure 2:
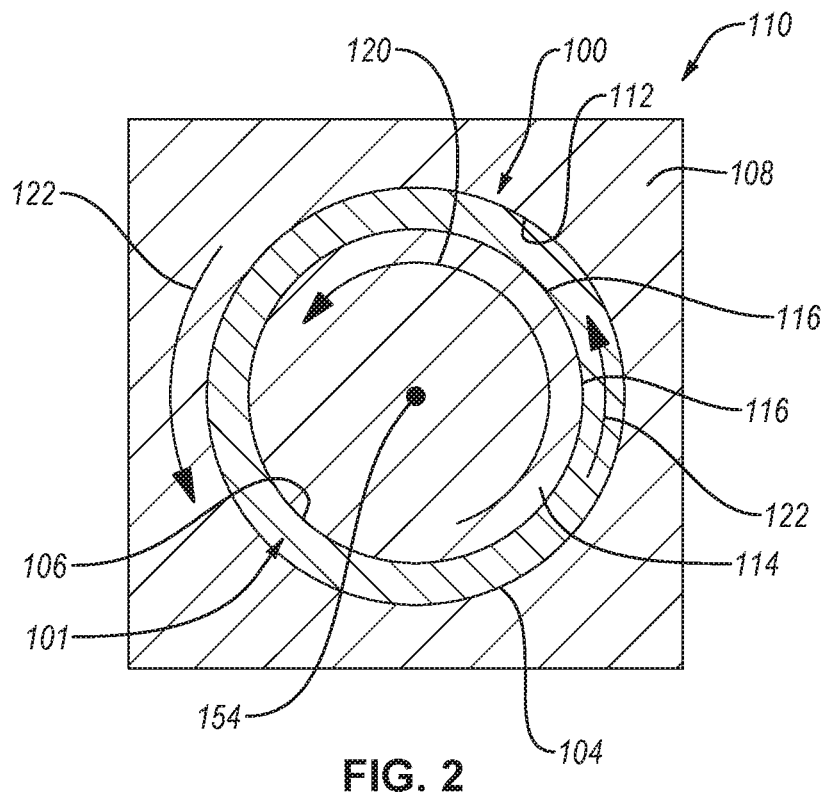
FIG. 2 is a cross-sectional end view of a bearing joint, according to one or more examples of the present disclosure.
Figure 17:
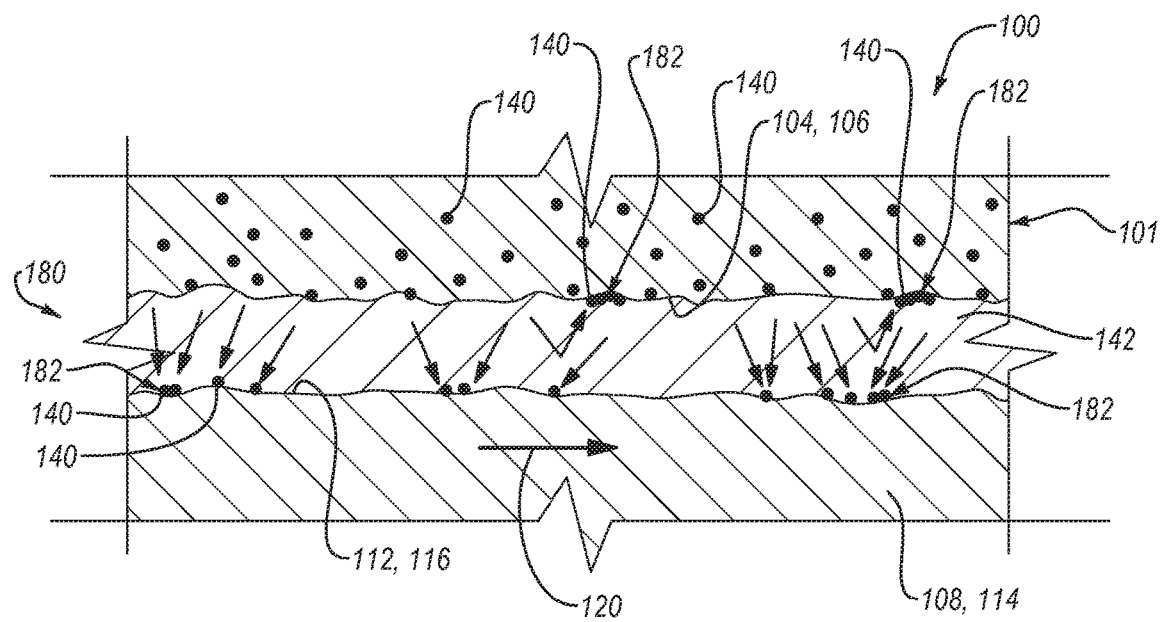
FIG. 17 is a cross-sectional side view of a frictional interface of a bearing joint, according to one or more examples of the present disclosure.
Figure 18:
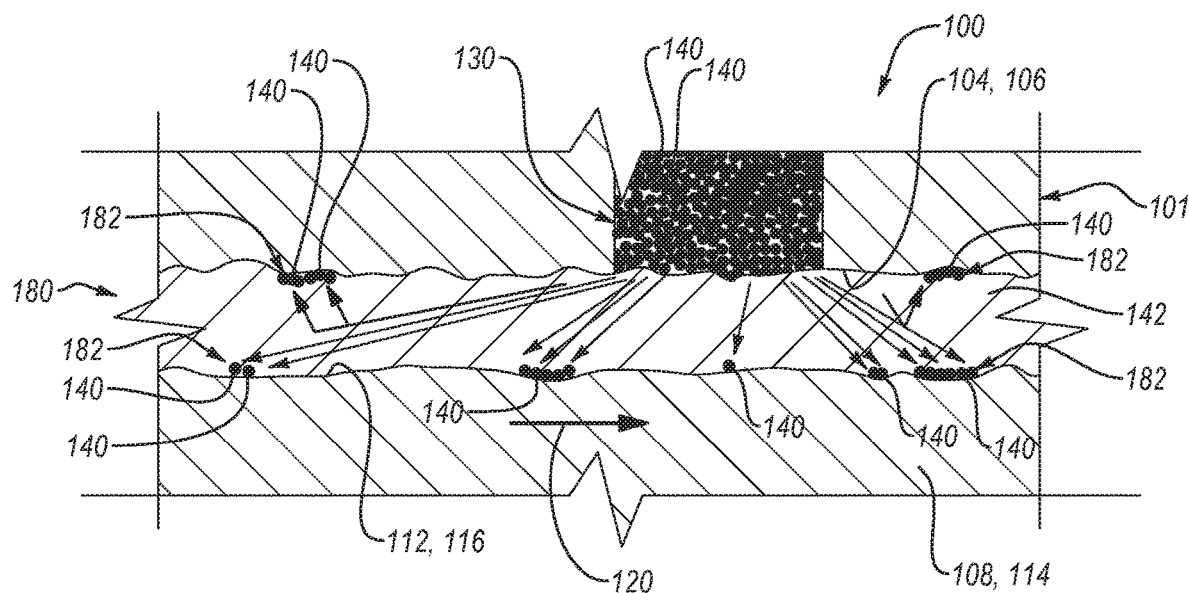
FIG. 18 is a cross-sectional side view of a frictional interface of another bearing joint, according to one or more examples of the present disclosure.

Frictionally-induced pressure acts on the base 101 when a part (e.g., shaft 114 of FIG. 2), forming a frictional interface 180 with the base 101, rotates relative to the base 101. As used herein, a frictional interface is an interface defined between two surfaces in contact with each other and moving (e.g., sliding) relative to each other. Referring to FIGS. 17 and 18, in one example, the frictional interface 180 of the bearing joint 110 is between the cylindrical inner surface 106 of the base 101 of the bearing 100 and the exterior surface 116 of the shaft 114 where the shaft 114 rotates (see arrow 120) relative to the bearing 100 and a bearing housing 108. The bearing housing 108 contains the bearing 100 within a channel 112 formed in the bearing housing 108. According to an alternative example, the frictional interface 180 of the bearing joint 110 is between the cylindrical outer surface 104 of the base 101 of the bearing 100 and the interior surface of the channel 112 of the bearing housing 108 where the bearing housing 108 rotates (see arrow 122) relative to the bearing 100 and shaft 114. In the example where the shaft 114 rotates relative to the bearing 100, the bearing 100 forms an interference fit with the channel 112 of the bearing housing 108 such that the bearing 100 does not rotate relative to the bearing housing 108. In contrast, in the example where the bearing housing 108 rotates relative to the bearing 100, the bearing 100 forms an interference fit with the exterior surface 116 of the shaft 114 such that the bearing 100 does not rotate relative to the shaft 114. According to some examples, as shown in FIG. 17, the bearing joint 110 includes a lubricant 142 within the frictional interface 180 or interposed between the surfaces defining the frictional interface 180. The lubricant 142 can be any of various lubricants (e.g., oils, greases, etc.) configured to reduce friction between the surfaces of the frictional interface 180. According to some examples, the lubricant 142 is void of selective transfer materials.

As shown in FIG. 1, in some examples, the selective transfer material 140 is substantially uniformly distributed throughout the base 101. Accordingly, some particles of the selective transfer material 140 are at or near the cylindrical outer surface 104 and the cylindrical inner surface 106 and some particles of the selective transfer material 140 are away from the cylindrical outer surface 104 and the cylindrical inner surface 106 (e.g., at a mid-portion of the base 101 between the cylindrical outer surface 104 and the cylindrical inner surface 106). The particles of the selective transfer material 140 at or near the cylindrical outer surface 104 or the cylindrical inner surface 106, depending on which surface defines the frictional interface 180 of the bearing joint 110, is capable of being selectively transferred, while those particles of the selective transfer material 140 away from the cylindrical outer surface 104 and the cylindrical inner surface 106 are not. As described below in association with FIG. 24, uniform distribution of the selective transfer material 140 can be accomplished using a powdered metallurgical process to form the bearing 100.

According to some examples, as shown in FIGS. 3-16, instead of uniformly distributing the selective transfer material 140 throughout the base 101, the selective transfer material 140 is contained within one or more recesses 130 formed in at least one surface of the base 101. In certain examples, as shown in FIGS. 3, 4, 7, 8, 11, 12, and 15, the recesses 130 are formed in the cylindrical inner surface 106 of the base 101 to accommodate a shaft 114 that rotates relative to the bearing 100. In contrast, according to some examples and as shown in FIGS. 5, 6, 9, 10, 13, 14, and 16, the recesses 130 are formed in the cylindrical outer surface 104 of the base 101 to accommodate a bearing housing 108 that rotates relative to the bearing 100. In either configuration, each one of the recesses 130 receives and contains the selective transfer material 140. According to certain implementations, the material in the recesses 130 is exclusively the selective transfer material 140. In other words, in certain implementations, only the selective transfer material 140 is contained within the recesses 130.

Figure 8:
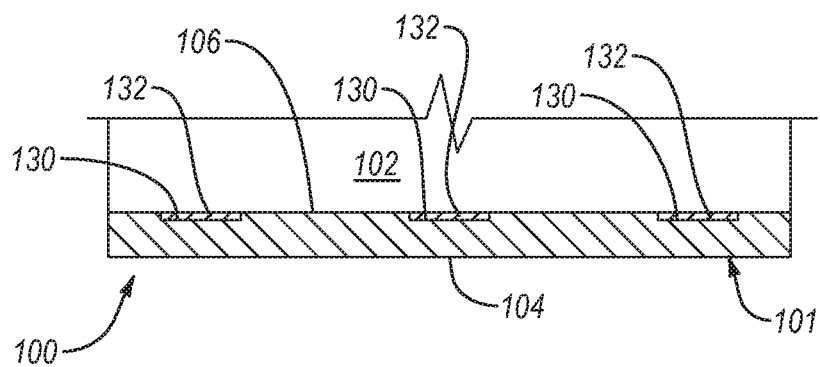
FIG. 8 is a cross-sectional side view of a portion of a bearing, according to one or more examples of the present disclosure.

As shown in FIG. 8, the one or more recesses 130 formed in the cylindrical inner surface 106 are open to the central channel 102. Accordingly, each one of the recesses 130 has an opening that faces the central channel 102. The size and shape of the opening in a recess 130 corresponds with the size and shape of the recess 130. With the selective transfer material 140 contained within the recesses 130 or recesses 130 formed in the cylindrical inner surface 106, the selective transfer material 140 is exposed or open to the central channel 102. In some implementations, the exposed surface of the selective transfer material 140 is, at least initially, flush with the cylindrical inner surface 106. In yet other implementations, the exposed surface of the selective transfer material 140 is, at least initially, protrudes interiorly into the central channel 102 beyond the cylindrical inner surface 106. According to an alternative implementation, the exposed surface of the selective transfer material 140 is recessed relative to or set back from the cylindrical inner surface 106.

Figure 3:
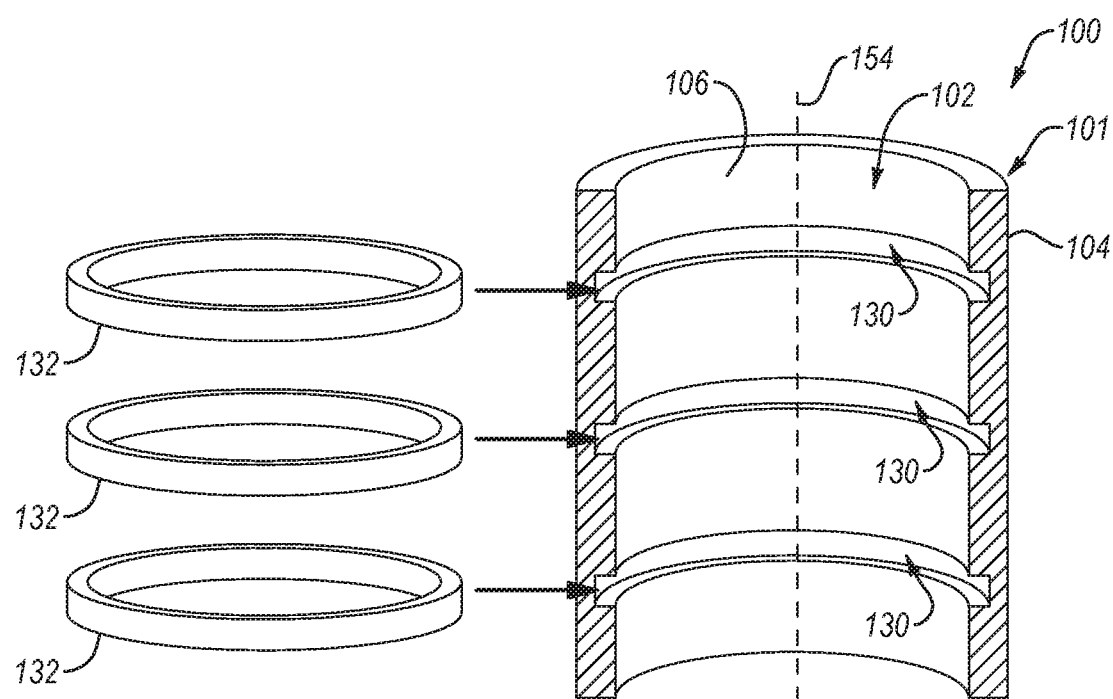
FIG. 3 is a partial cross-sectional exploded perspective view of a bearing, according to one or more examples of the present disclosure.
Figure 4:
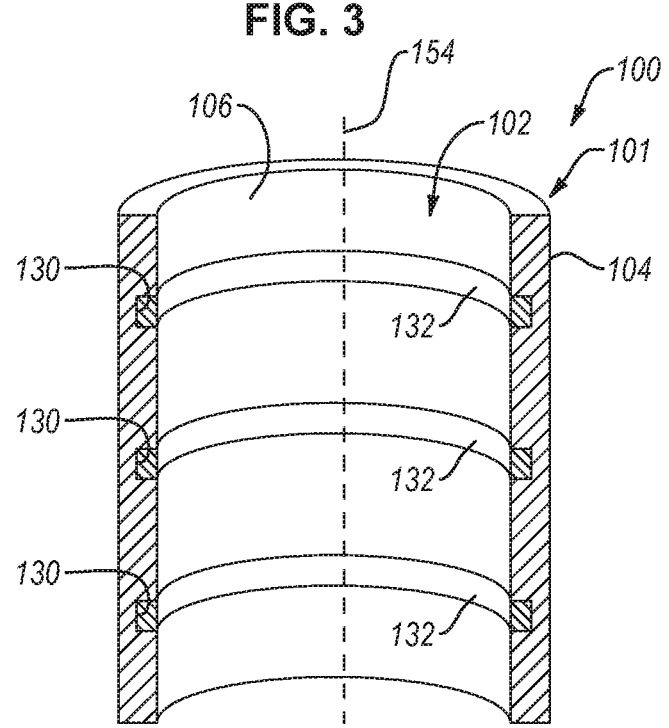
FIG. 4 is a cross-sectional perspective view of the bearing of FIG. 3, according to one or more examples of the present disclosure.

In a first example of recesses 130 formed in the cylindrical inner surface 106, as shown in FIGS. 3 and 4, each one of the recesses 130 forms a continuous ring (i.e., has a continuous ring-like shape or an annulus shape) about the cylindrical inner surface 106. Accordingly, each one of the recesses 130 extends circumferentially about the cylindrical inner surface 106. In those implementations in which the bearing 100 includes multiple recesses 130, the recesses 130 of FIGS. 3 and 4 are spaced apart along a length of the base 101, which extends parallel to the central axis 154 of the central channel 102. The selective transfer material 140 is formed into selective transfer material (STM) elements 132 as the selective transfer material 140 is added to (e.g., filled into) the recesses 130. Each one of the STM elements 132 is associated with a corresponding one of the recesses 130. Moreover, each one of the STM elements 132 of the bearing 100 of FIGS. 3 and 4 is ring shaped. Accordingly, the selective transfer material 140 takes the same shape as the recess 130 in which it is contained. Although in the illustrated implementation of the first example of FIGS. 3 and 4, the base 101 includes three recesses 130 and three STM elements 132, in other implementations of the first example, the base 101 includes one, two, or more than three recesses 130 and a corresponding number of STM elements 132.

Figure 7:
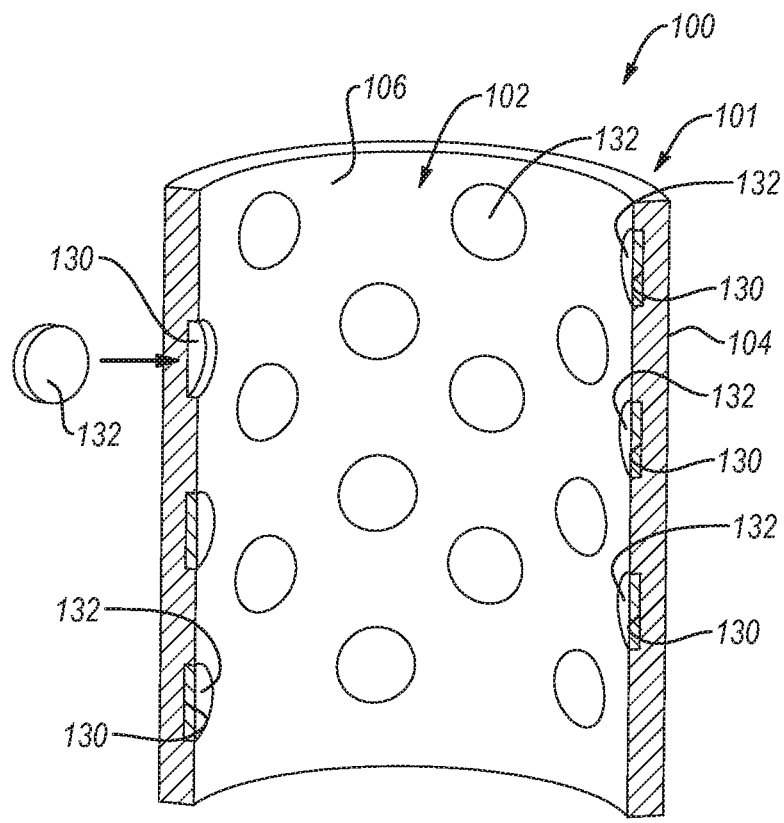
FIG. 7 is a partial cross-sectional exploded perspective view of a bearing, according to one or more examples of the present disclosure.

In a second example of recesses 130 formed in the cylindrical inner surface 106, as shown in FIG. 7, each one of the recesses 130 forms a non-continuous shape that is entirely surrounded by the cylindrical inner surface 106. Accordingly, each one of the recesses 130 extends less than a full circumference and less than a full length of the cylindrical inner surface 106. In the illustrated implementation of the second example, each one of the recesses 130 has a circular shape such that each STM element 132 has a disk-like shape. However, in other implementations of the second example, each one of the STM elements 132 can have shapes other than circular, such as ovular, triangular, square, rectangular, polygonal, and the like. Moreover, the STM elements 132 of the second example can have shapes that are different from each other. In those implementations in which the bearing 100 includes multiple recesses 130, the recesses 130 of FIG. 7 are spaced apart in any of various directions (e.g., along a length and/or circumference of the base 101). The recesses 130 of FIG. 7 can be arranged in a uniform or non-uniform pattern about the cylindrical inner surface 106.

Figure 11:
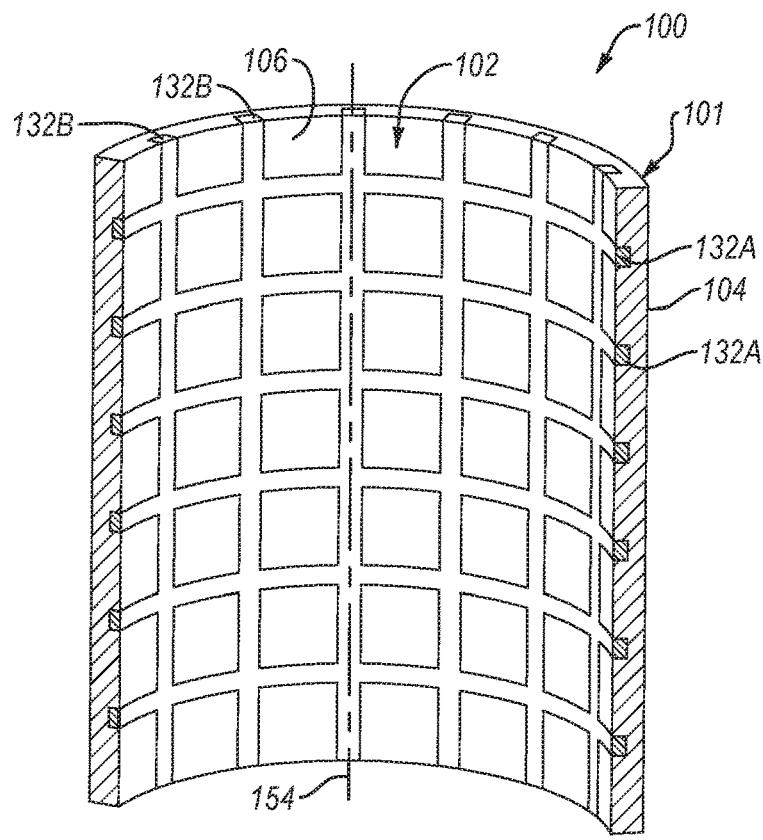
FIG. 11 is a cross-sectional perspective view of a bearing, according to one or more examples of the present disclosure.

In a third example of recesses 130 formed in the cylindrical inner surface 106, as shown in FIG. 11, some of the recesses 130 form a continuous ring shape that extends circumferentially around the cylindrical inner surface 106, and some of the recesses 130 extend longitudinally along the cylindrical inner surface 106 parallel with the central axis 154 of the central channel 102. Corresponding ones of first SMT elements 132A and second SMT elements 132B are contained within the circumferential recesses 130 and the longitudinal recesses 130, respectively. The circumferential recesses 130 of the third example are spaced apart from each other along the central axis 154 and the longitudinal recesses 130 of the third example are spaced part from each other circumferentially about the cylindrical inner surface 106. Moreover, the circumferential recesses 130 pass through and are angled relative to the longitudinal recesses 130 such that the recesses 130 collectively define a grid-like pattern in the cylindrical inner surface 106. In FIG. 11, the circumferential recesses 130 are angled at 90-degree angles relative to the longitudinal recesses 130.

Figure 12:
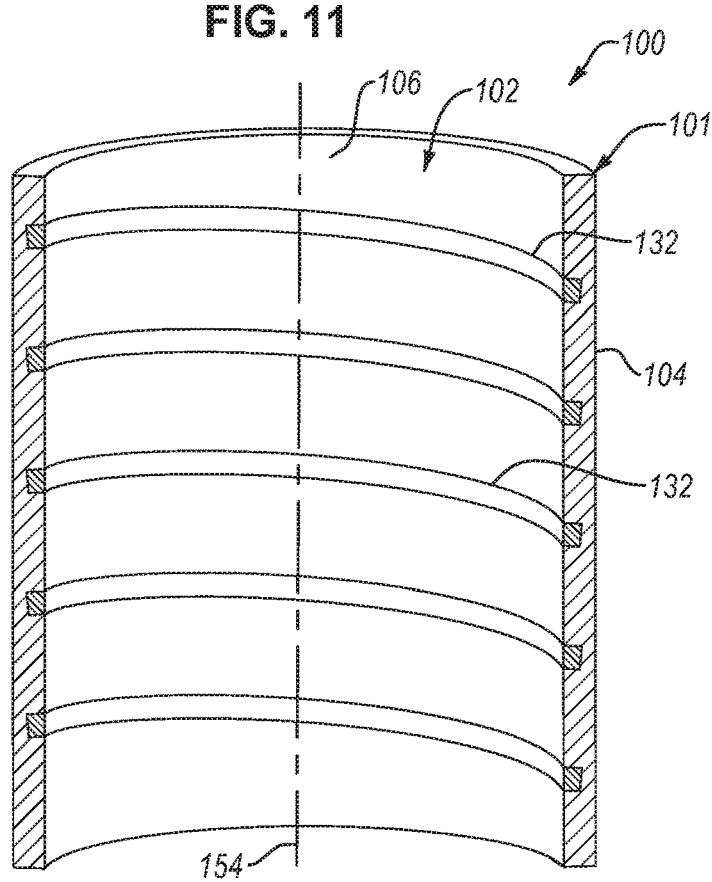
FIG. 12 is a cross-sectional perspective view of another bearing, according to one or more examples of the present disclosure.

In a fourth example of recesses 130 formed in the cylindrical inner surface 106, as shown in FIG. 12, a single recess 130 forms a helix that wraps around the cylindrical inner surface 106 along the central axis 154 of the central channel 102. According to the fourth example, a corresponding helically-shaped SMT element 132 is contained within the recess 130.

Figure 15:
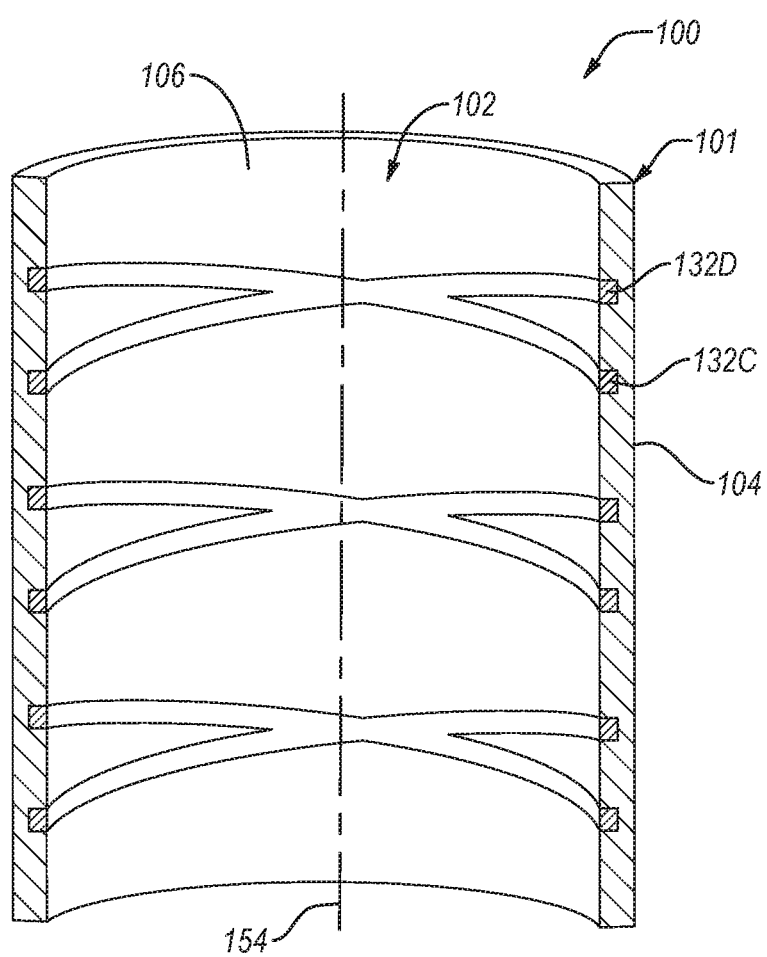
FIG. 15 is a cross-sectional perspective view of a bearing, according to one or more examples of the present disclosure.

In a fifth example of recesses 130 formed in the cylindrical inner surface 106, as shown in FIG. 15, at least two recesses 130 form corresponding helices that wrap around the cylindrical inner surface 106. Corresponding ones of third SMT elements 132C and fourth SMT elements 132D are contained within the two recesses 130, respectively. The recesses 130 pass through and are angled relative to each other such that the recesses 130 collectively define a cross-hatch pattern in the cylindrical inner surface 106. In FIG. 15, the recesses 130 are angled relative to each other at angles greater than 90-degrees.

Figure 10:
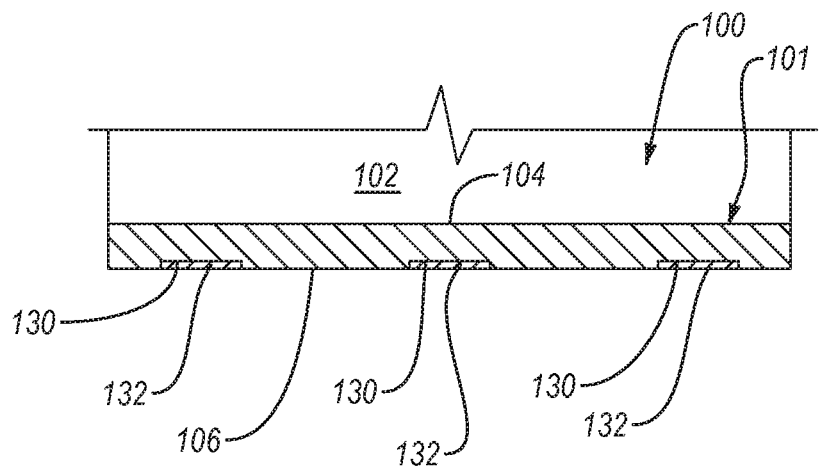
FIG. 10 is a cross-sectional side view of a portion of a bearing, according to one or more examples of the present disclosure.

As mentioned above, in certain examples, the one or more recesses 130 can be formed in the cylindrical outer surface 104 of the base 101. As shown in FIG. 10, the one or more recesses 130 formed in the cylindrical outer surface 104 are open to the exterior of the base 101. Accordingly, each one of the recesses 130 has an opening that faces away from the central channel 102. With the selective transfer material 140 contained within the recesses 130 or recesses 130 formed in the cylindrical outer surface 104, the selective transfer material 140 is exposed or open to the exterior of the base 101. In some implementations, the exposed surface of the selective transfer material 140 is, at least initially, flush with the cylindrical outer surface 104. In yet other implementations, the exposed surface of the selective transfer material 140 is, at least initially, protrudes exteriorly away from the cylindrical outer surface 104. According to an alternative implementation, the exposed surface of the selective transfer material 140 is recessed relative to or set back from the cylindrical outer surface 104.

Figure 5:
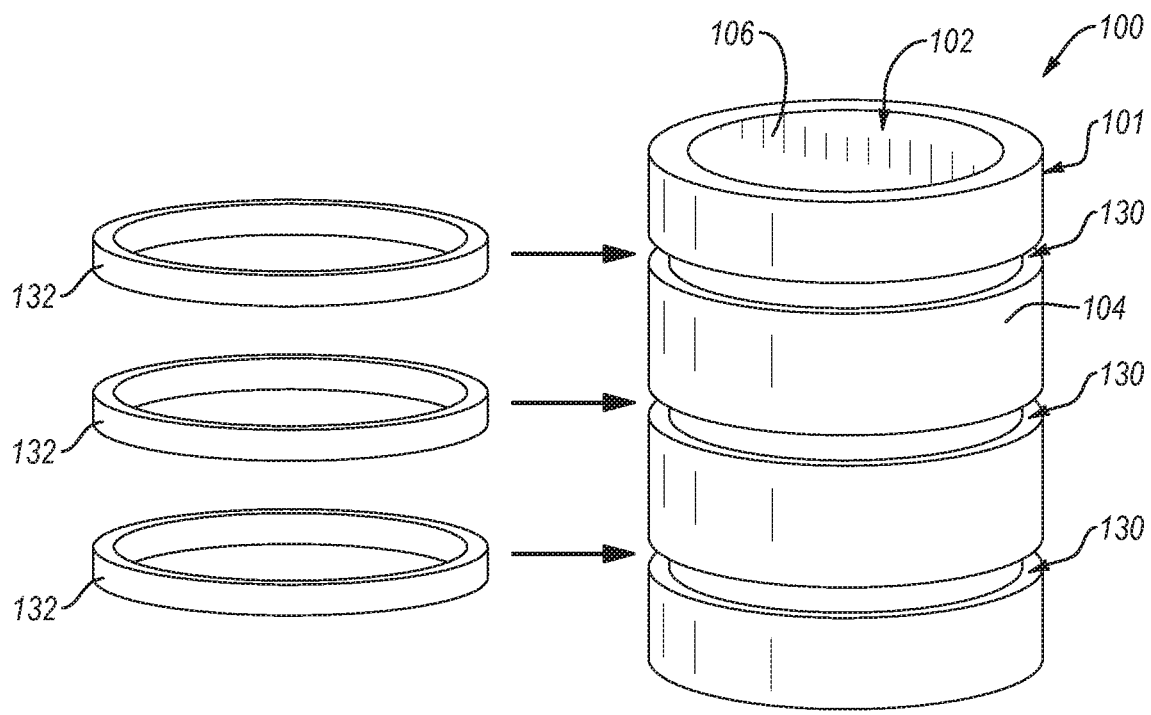
FIG. 5 is an exploded perspective view of a bearing, according to one or more examples of the present disclosure.
Figure 6:
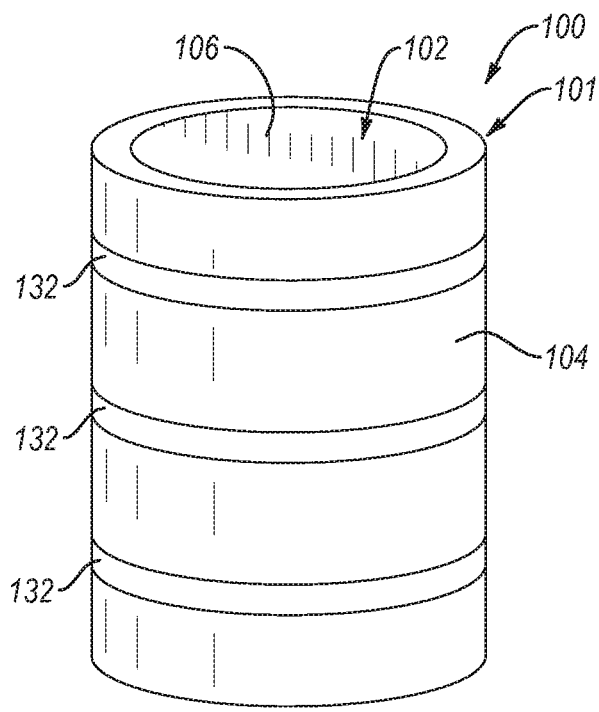
FIG. 6 is a perspective view of the bearing of FIG. 5, according to one or more examples of the present disclosure.

In a first example of recesses 130 formed in the cylindrical outer surface 104, as shown in FIGS. 5 and 6, each one of the recesses 130 forms a continuous ring about the cylindrical outer surface 104. Accordingly, each one of the recesses 130 extends circumferentially about the cylindrical outer surface 104. In those implementations in which the bearing 100 includes multiple recesses 130, the recesses 130 of FIGS. 5 and 6 are spaced apart along the length of the base 101. Each one of the STM elements 132 of the bearing 100 of FIGS. 5 and 6 is ring shaped. Although in the illustrated implementation of the first example of FIGS. 5 and 6, the base 101 includes three recesses 130 and three STM elements 132, in other implementations of the first example, the base 101 includes one, two, or more than three recesses 130 and a corresponding number of STM elements 132.

Figure 9:
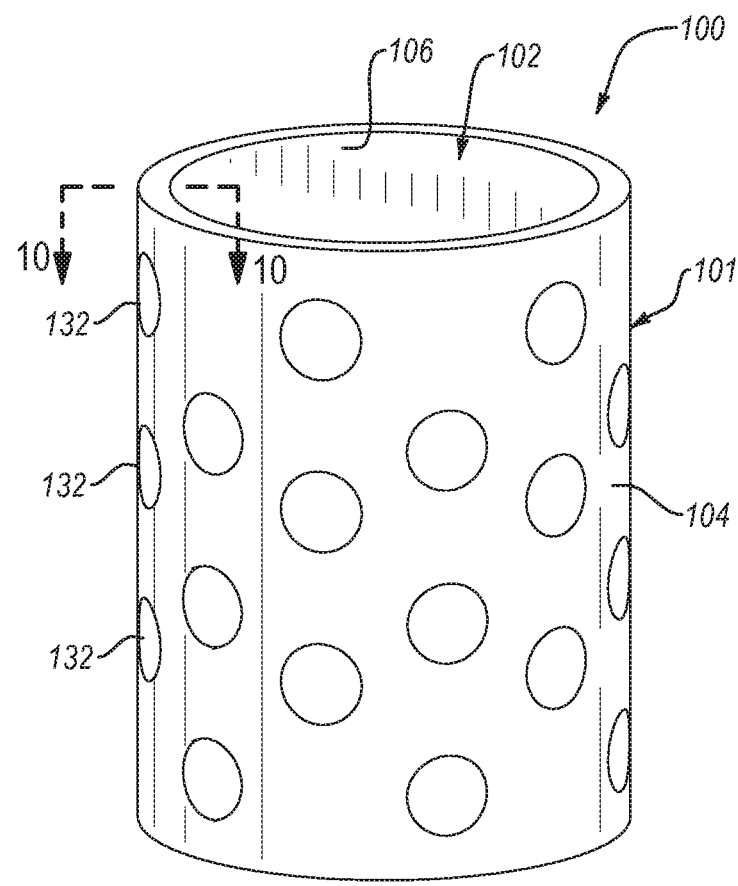
FIG. 9 is a perspective view of a bearing, according to one or more examples of the present disclosure.

In a second example of recesses 130 formed in the cylindrical outer surface 104, as shown in FIG. 9, each one of the recesses 130 forms a non-continuous shape that is entirely surrounded by the cylindrical outer surface 104. Accordingly, each one of the recesses 130 extends less than a full circumference and less than a full length of the cylindrical outer surface 104. Each one of the recesses 130 and the STM elements 132 in the cylindrical outer surface 104 of the second example can be sized, shaped, and arranged as described in association with the recesses 130 and the STM elements 132 in the cylindrical inner surface 106 of FIG. 7.

Figure 13:
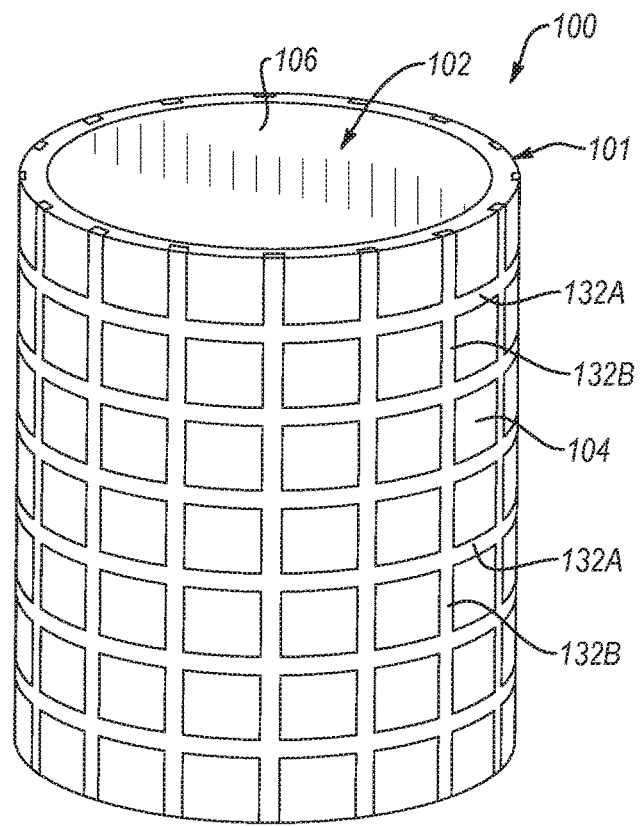
FIG. 13 is a perspective view of yet another bearing, according to one or more examples of the present disclosure.

In a third example of recesses 130 formed in the cylindrical outer surface 104, as shown in FIG. 13, some of the recesses 130 form a continuous ring shape that extends circumferentially around the cylindrical outer surface 104, and some of the recesses 130 extend longitudinally along the cylindrical outer surface 104 parallel with the central axis 154 of the central channel 102. Corresponding ones of first SMT elements 132A and second SMT elements 132B are contained within the circumferential recesses 130 and the longitudinal recesses 130, respectively. The circumferential recesses 130 and longitudinal recesses 130 of the third example of FIG. 13 can be spaced apart from each other and angled relative to each other in the same manner as described above in relation to the third example of FIG. 11.

Figure 14:
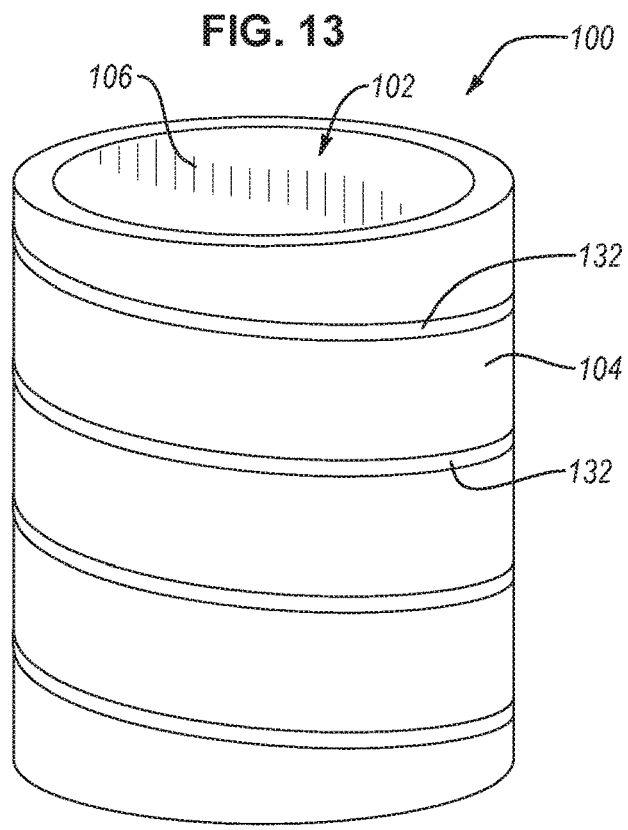
FIG. 14 is a perspective view of another bearing, according to one or more examples of the present disclosure.

In a fourth example of recesses 130 formed in the cylindrical outer surface 104, as shown in FIG. 14, a single recess 130 forms a helix that wraps around the cylindrical outer surface 104 along the central axis 154 of the central channel 102. According to the fourth example, a corresponding helically-shaped SMT element 132 is contained within the recess 130.

Figure 16:
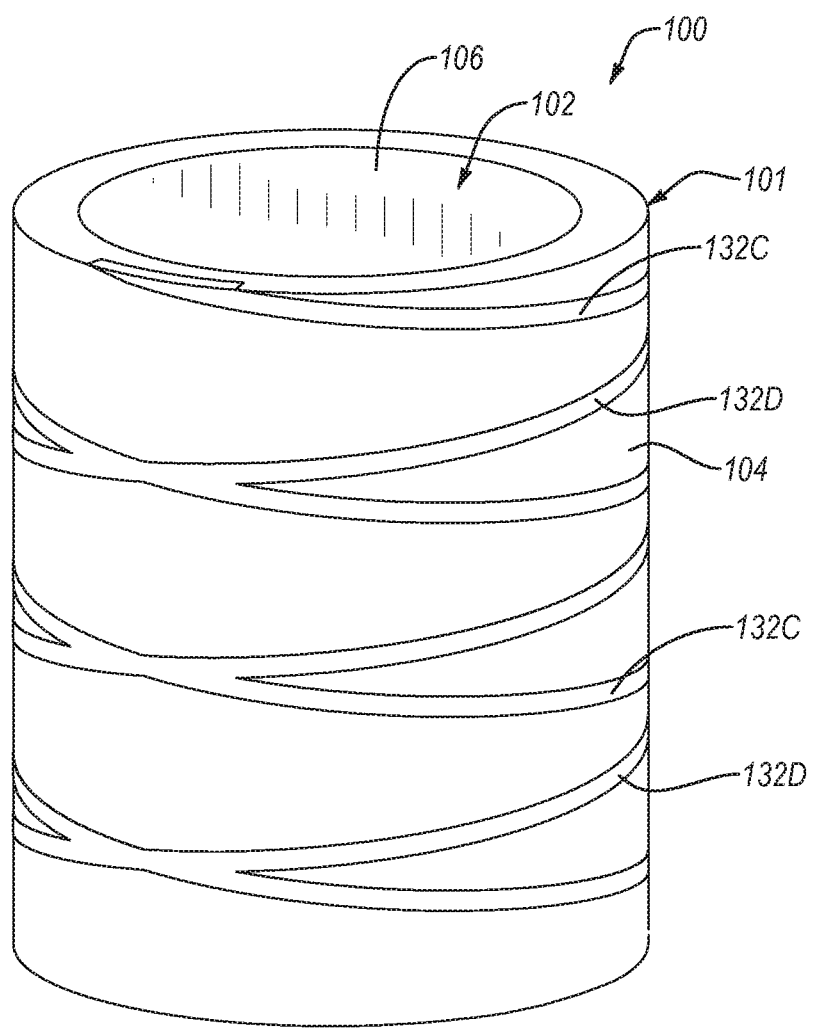
FIG. 16 is a perspective view of another bearing, according to one or more examples of the present disclosure.

In a fifth example of recesses 130 formed in the cylindrical outer surface 104, as shown in FIG. 16, at least two recesses 130 form corresponding helices that wrap around the cylindrical outer surface 104. Corresponding ones of third SMT elements 132C and fourth SMT elements 132D are contained within the two recesses 130, respectively. The recesses 130 of the fifth example of FIG. 16 can be spaced apart from each other and angled relative to each other in the same manner as described above in relation to the fifth example of FIG. 15.

Figure 19:
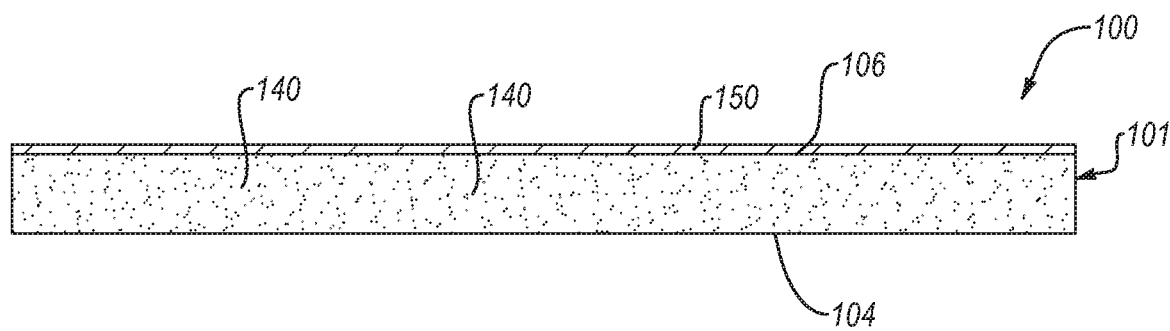
FIG. 19 is a cross-sectional side view of a portion of a bearing, according to one or more examples of the present disclosure.
Figure 20:
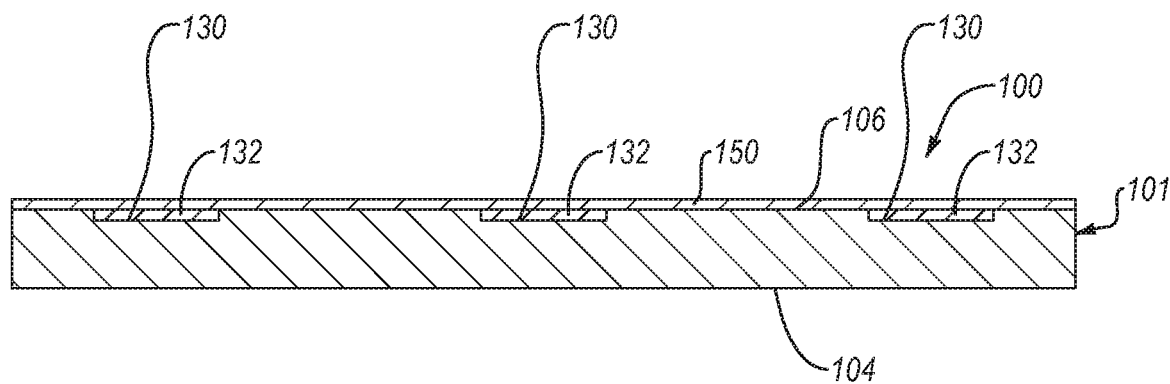
FIG. 20 is a cross-sectional side view of a portion of another bearing, according to one or more examples of the present disclosure.

According to certain examples, depending on whether the cylindrical inner surface 106 or the cylindrical outer surface 104 of the base 101 forms the frictional interface 180, the bearing 100 further includes an interior layer 150 or an exterior layer 152, respectively. Referring to FIGS. 19 and 20, in examples where the cylindrical inner surface 106 defines the frictional interface 180 (e.g., the shaft 114 rotates relative to the bearing 100), the bearing 100 includes an interior layer 150. The interior layer 150 is directly coupled to the cylindrical inner surface 106 in certain implementations. Accordingly, the interior layer 150 interiorly covers the cylindrical inner surface 106 and the selective transfer material 140. As shown in FIG. 19, the interior layer 150 covers the cylindrical inner surface 106 of the base 101 and the selective transfer material 140 uniformly distributed through the base 101. In contrast, in FIG. 20, the interior layer 150 covers the cylindrical inner surface 106 of the base 101 and the SMT elements 132 contained in the recesses 130 formed in the cylindrical inner surface 106.

Figure 21:
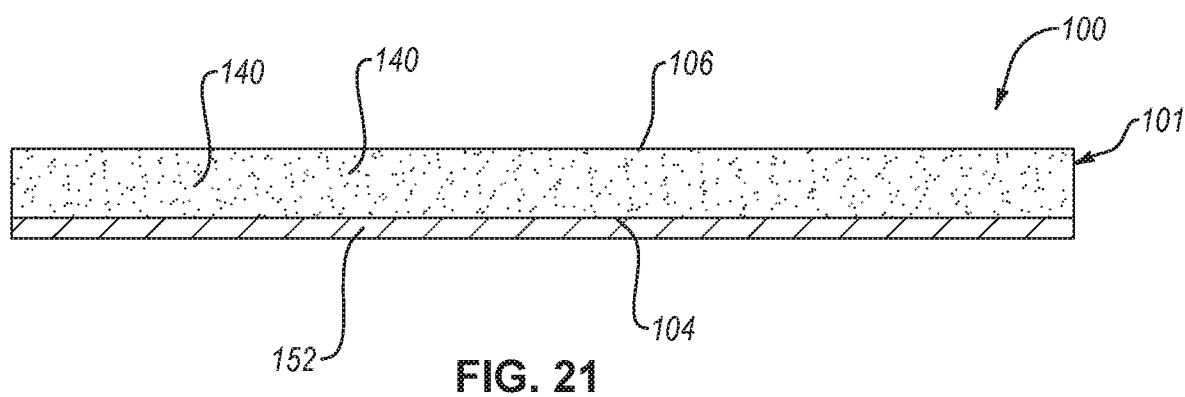
FIG. 21 is a cross-sectional side view of a portion of yet another bearing, according to one or more examples of the present disclosure.
Figure 22:
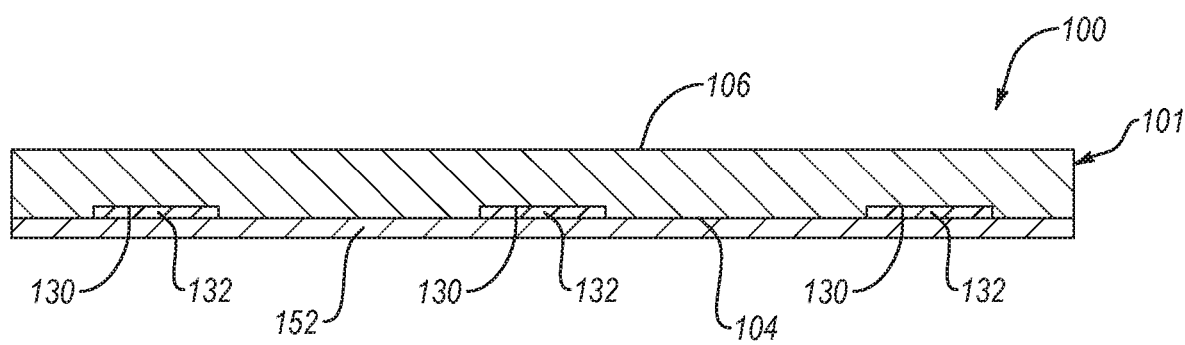
FIG. 22 is a cross-sectional side view of a portion of another bearing, according to one or more examples of the present disclosure.

Now referring to FIGS. 21 and 22, in examples where the cylindrical outer surface 104 defines the frictional interface 180 (e.g., the bearing housing 108 rotates relative to the bearing 100), the bearing 100 includes an exterior layer 152. The exterior layer 152 is directly coupled to the cylindrical outer surface 104 in certain implementations. Accordingly, the exterior layer 152 exteriorly covers the cylindrical outer surface 104 and the selective transfer material 140. As shown in FIG. 21, the exterior layer 152 covers the cylindrical outer surface 104 of the base 101 and the selective transfer material 140 uniformly distributed through the base 101. In contrast, in FIG. 22, the exterior layer 152 covers the cylindrical outer surface 104 of the base 101 and the SMT elements contained in the recesses 130 formed in the cylindrical outer surface 104.

Although in some of the illustrated examples, the recesses 130 of the bearing 100 are uniformly sized and spaced, in other examples, the recesses 130 of a bearing 100 may be non-uniformly sized and/or spaced. In bearing joints 110 where wear of the surfaces defining the frictional interface of the bearing joints 110 may be non-uniform, the recesses 130 and corresponding SMT elements 132 may be sized or spaced non-uniformly to accommodate such uneven wear. For example, if wear is more pronounced at a particular end of a bearing joint 110, the recess 130 or recesses 130 at that end may be wider have a higher recess-to-area density than at another end of the bearing joint 110 where wear may be less.

Each one of the interior layer 150 and the exterior layer 152 is configured to initially form the frictional interface 180, but relatively quickly wear away during an initial period of use of the bearing 100. In one example, the one of the interior layer 150 or the exterior layer 152 that is coupled to the base 101 helps protect the bearing 100 during storage and installation of the bearing 100. Additionally, in certain examples, the one of the interior layer 150 or the exterior layer 152 that is coupled to the base 101 promotes the initial selective transfer of material from the bearing 100 to the opposing surface forming the frictional interface 180. The interior layer 150 and the exterior layer 152 are made of any of various metallic materials (e.g., copper, aluminum, zinc, tin, lead, antimony, babbitt, brass, bronze, etc.) or polymeric materials. In some examples, the maximum thickness of the interior layer 150 and the exterior layer 152 is less than or equal to 0.03 millimeters (0.001 inches).

Figure 24:
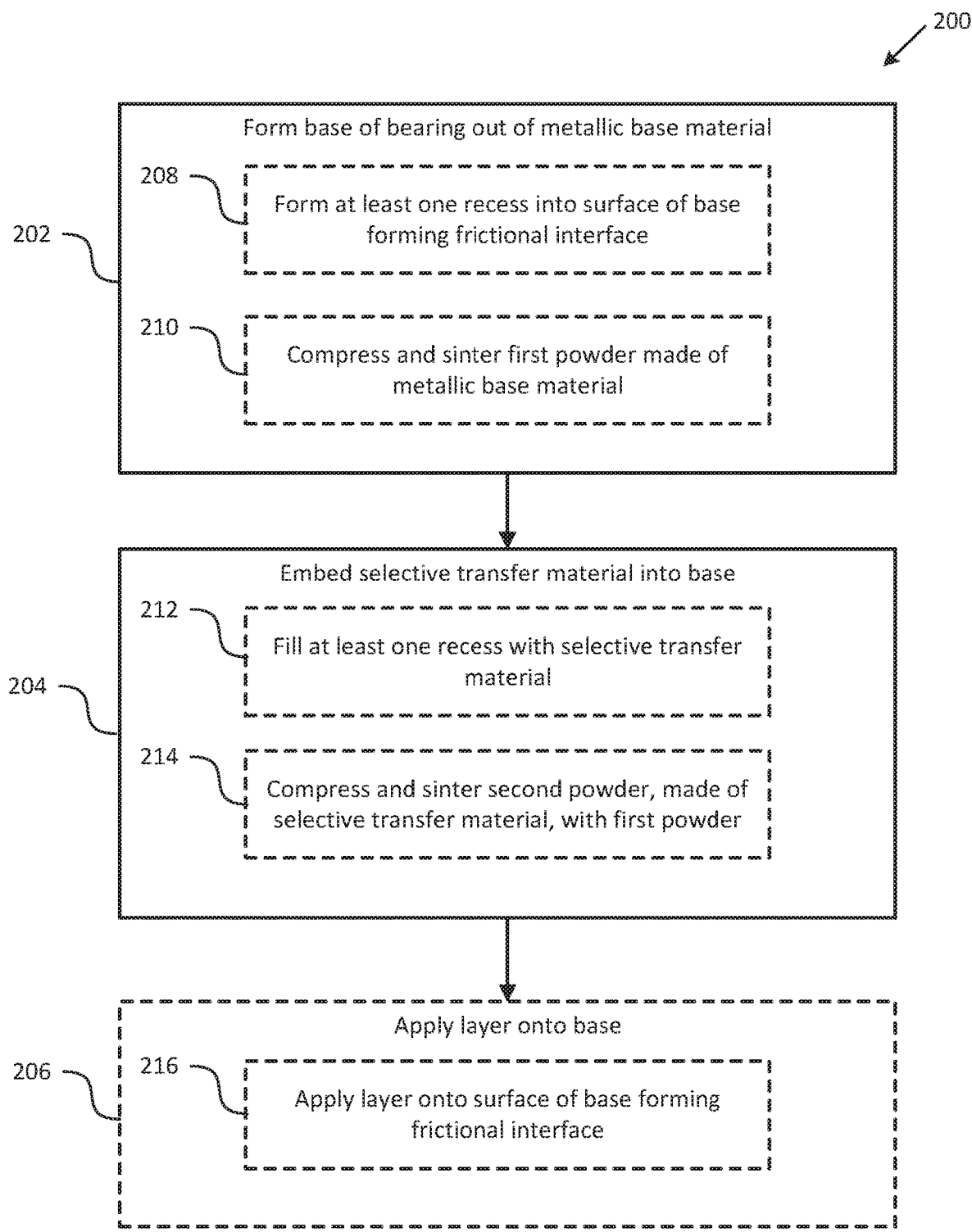
FIG. 24 is a schematic flow diagram of a method of making a bearing, according to one or more examples of the present disclosure.

Referring to FIG. 24, according to some examples of a method 200, the bearing 100 is made by (block 202) forming the base 101 out of the metallic base material and (block 204) embedding the selective transfer material 140 into the base 101. The base 101 comprises a cylindrical outer surface 104, a cylindrical inner surface 106 that is opposite the cylindrical outer surface 104, and a central channel 102 that is defined by the cylindrical inner surface 106 and extends through the base 101. Further, the selective transfer material (140) is selected from the group consisting of tin, zinc, copper, iron, lead, palladium, cobalt, titanium dioxide, copper oxide, iron oxide black (Fe3O4), zinc oxide, aluminum oxide, zinc dialkyl dithiophosphate (ZDDP), molybdenum disulfide, graphene, Si3N4, AlN, CaCO3, MgO, and serpentine minerals.

Within examples, the method 200 of making the bearing 100 also includes (block 206) applying one of the interior layer 150 or the exterior layer 152 to the cylindrical inner surface 106 of the base 101 or the cylindrical outer surface 104 of the base 101, depending on which of the cylindrical inner surface 106 or the cylindrical outer surface 104 forms the frictional interface 180 of a bearing joint 110. In some implementations, the method 200 includes applying the interior layer 150 to the cylindrical inner surface 106 of the base 101 and applying the exterior layer 152 to the cylindrical outer surface 104 of the base 101 regardless of which of the cylindrical inner surface 106 or the cylindrical outer surface 104 forms the frictional interface 180 of a bearing joint 110. The interior layer 150 and the exterior layer 152 can be applied to the corresponding surfaces of the base 101 using any of various application techniques, such as plating (e.g., electroplating or electroless plating), deposition (e.g., chemical deposition or physical deposition), and the like.

According to certain examples, the selective transfer material 140 is embedded into the base 101 by (block 208) forming at least one recess 130 into the surface of the base 101 forming the frictional interface 180 of a bearing joint 110 (e.g., the cylindrical outer surface 104 of the base 101 or the cylindrical inner surface 106 of the base 101) and (block 212) filling the at least one recess 130 with the selective transfer material 140. In one implementation, the base 101 is initially formed without the at least one recess 130 and the at least one recess 130 is subsequently cut into the base 101, such as via a lathe or other power tool. The base 101 can be formed using any of various techniques, such a molding, forging, rolling, or stamping. In one particular implementation, the base 101 is formed by (block 210) compressing and sintering a first powder material made of the metallic base material according to powder metallurgical processing techniques. Alternatively, in certain implementations, the at least one recess 130 is co-formed with the base 101, such as via a molding, forging, or stamping technique. The selective transfer material 140 is filled into the at least one recess 130 to form the at least one STM element 132 using any of various techniques, such as plating, deposition, and the like.

In yet other examples, the selective transfer material 140 is embedded into the base 101 by (block 214) compressing and sintering a second powder, made of the selective transfer material 140, together with the first powder. In other words, the second powder is combined with the first powder to form a powder mixture, which is compressed and sintered according to powder metallurgical processing techniques. The first powder and the second powder can be evenly mixed such that the second powder is uniformly distributed with the first powder in the powder mixture when the powder mixture is compressed and sintered to form the base 101.

Figure 25:
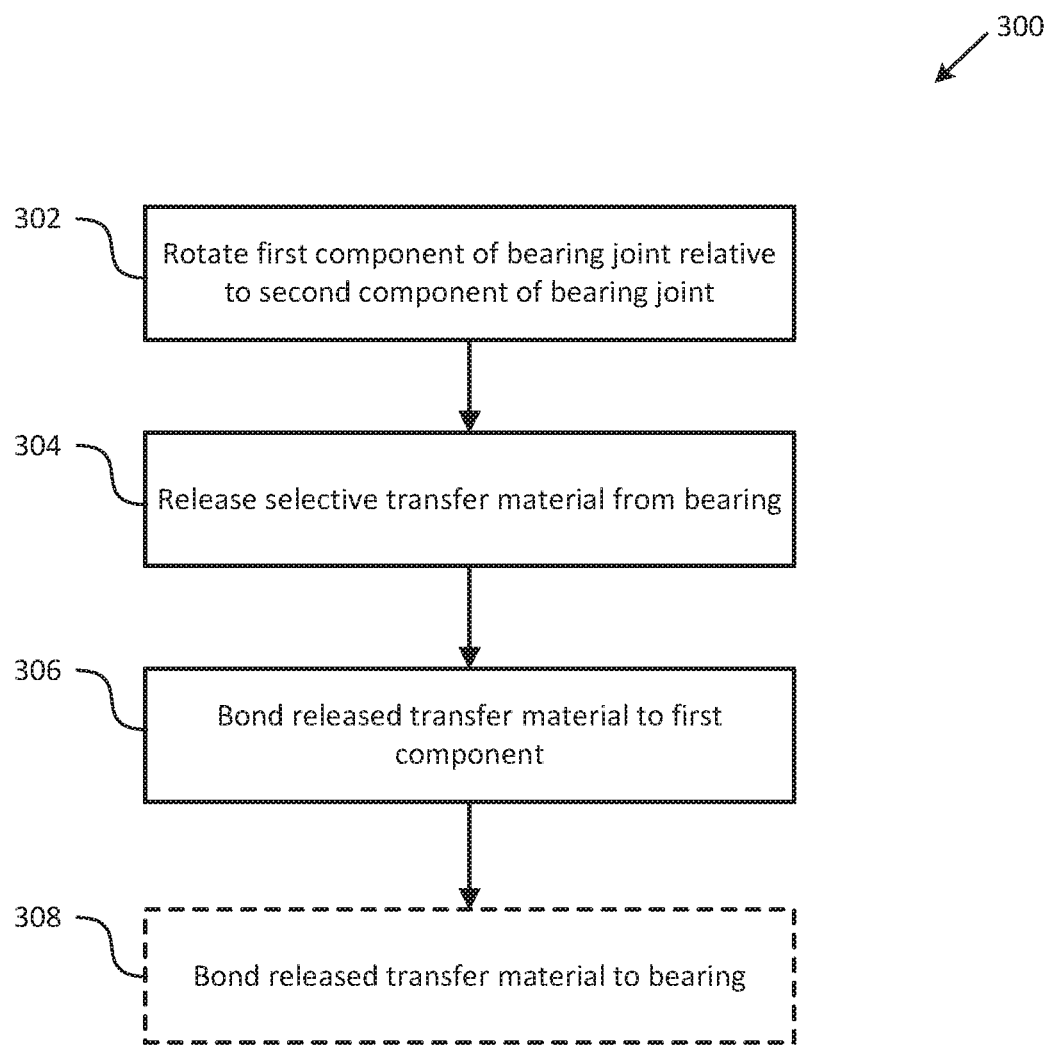
FIG. 25 is a schematic flow diagram of a method of reducing wear in a bearing joint, according to one or more examples of the present disclosure.

After the bearing 100 is formed and assembled with the shaft 114 and the bearing housing 108 to form the bearing joint 110, the bearing joint 110 is operable to facilitate rotation of the shaft 114 relative to the bearing 100 or rotation of the bearing housing 108 relative to the bearing 100. Referring to FIG. 25, according to some examples, a method 300 of reducing wear in the bearing joint 110 is shown. The method 300 includes (block 302) rotating a first component of the bearing joint 110 relative to a second component of the bearing joint 110. The bearing joint 110 also includes the bearing 100 between the first component and the second component. The bearing 100 is fixed relative to the first component. In one example, the first component is the shaft 114 and the second component is the bearing housing 108. In another example, the first component is the bearing housing 108 and the second component is the shaft 114. The method 300 further includes (block 304) releasing the selective transfer material 140 from the bearing 100 and (block 306) bonding the selective transfer material 140 that was released from the bearing 100 to the first component. Additionally, in certain examples, the method 300 additionally includes (block 308) bonding the selective transfer material 140 that was released from the bearing 100 to the base 101 of the bearing 100.

Examples of the method 300 of FIG. 25 is illustrated schematically in FIGS. 17 and 18. FIG. 17 schematically shows the method 300 executed with a bearing joint 110 having a bearing 100 where the selective transfer material 140 is uniformly distributed through the base 101 of the bearing 100 and FIG. 18 schematically shows the method 300 executed with a bearing joint 110 having a bearing 100 where the selective transfer material 140 is contained within recesses 130.

As the first component, which can be either the shaft 114 or the bearing housing 108, rotates relative to the bearing 100, the surface of the first component, which can be either the exterior surface 116 of the shaft or the surface of the channel 112, frictionally engages a corresponding surface, which can be either the cylindrical inner surface 106 or the cylindrical outer surface 104, of the base 101 of the bearing 100, to define the frictional interface 180. The gap between the surface of the first component and the corresponding surface of the base 101 forming the frictional interface 180 is exaggerated in FIG. 17 for illustrative purposes only. In reality, the surfaces are in substantial contact with each other such that the gap is zero, but for undulations in the surfaces where small gaps may exist. In some examples, the bearing joint 110 includes a lubricant 142 interposed between the surfaces forming the frictional interface to help reduce friction between and wear of the surfaces.

Despite the lubricant 142, frictional engagement of the surfaces of the frictional interface causes wear of the surfaces. As used herein, wear includes the removal of portions of the frictionally engaged surfaces of the bearing joint 110. The removal of portions of the first component and the base 101 due to frictional engagement creates voids in the corresponding surfaces. Such voids, if left unfilled, tend to increase frictional forces between the frictionally engaged surfaces, which accelerates the wear of the surfaces. Under frictionally-induced pressure (e.g., when the bearing 100 is frictionally engaged with a moving part), the bearing 100 is configured to selectively release the selective transfer material 140, embedded in the base 101, into the frictional interface 180. From the frictional interface 180, the released selective transfer material 140 bonds to and fills the voids in the frictionally engaged surfaces. These layers of selective transfer material 140 in the voids define passivating or reaction layers 182 (e.g., servovite layers), which help to smooth the surfaces, reduce the frictional forces between the surfaces, and reduce wear of the surfaces. Eventually, during further use of the bearing joint 110, the selective transfer material 140 bonded to the voids is released from the voids and discarded. Additional selective transfer material 140 is then selectively released from the bearing 100 to refill the voids. In this manner, the bearing 100 facilitates self-repair of the bearing joint 110 during operation of the bearing joint 110.

As shown in FIG. 17, for the bearing 100 with uniform distribution of the selective transfer material 140 through the base 101, the selective transfer material 140 released from the base 101 is the selective transfer material 140 at the surface of the base 101 defining the frictional interface 180. As the base 101 wears, more of the selective transfer material 140 is exposed and able to be selectively released from the base 101.

Referring to FIG. 18, for the bearing 100 with the selective transfer material 140 contained in recesses 130 of the base 101, the selective transfer material 140 released from the base 101 is the selective transfer material 140 in the recesses 130. As the selective transfer material 140 is released from the voids in the frictionally engaged surfaces, more and more of the selective transfer material 140 in the recesses 130 is selectively released from the base 101.

The release of the selective transfer material 140 from the base 101 occurs due to a selective transfer phenomenon (e.g., Garkunov effect) that occurs within the frictional interface 180. As the surfaces defining the frictional interface 180 frictionally engage, mechanochemistry and physiochemistry reactions within the frictional interface 180 induce attraction forces between the selective transfer material 140 embedded in the base 101 and the voids created in the frictionally engaged surfaces. These attraction forces cause the selective transfer material 140 to release from the base 101 and bond to the voids. Accordingly, where there is contact between rubbing surfaces of relatively soft metallic surfaces (or polymeric or ceramic surfaces), positively-charged surface-active matter is formed, which restricts the penetration of oxygen into the transferred material film. The charged particles transfer from one of the rubbing surfaces to the other and experience plasticization by means of the surface-active agents.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A bearing, comprising:
   a base, made of a metallic base material and comprising:
      a cylindrical outer surface;
      a cylindrical inner surface that is opposite the cylindrical outer surface; and
      a central channel defined by the cylindrical inner surface and extending through the base;
   a selective transfer material embedded in the base, wherein the selective transfer material is different than the metallic base material and is configured to release from the base in response to frictionally-induced pressure acting on the base and bond to voids in one of the cylindrical outer surface or the cylindrical inner surface; and
   one of:
      an interior layer directly coupled to the cylindrical inner surface and interiorly covering the cylindrical inner surface and the selective transfer material, wherein the interior layer is configured to wear away, during an initial period of use of the bearing, to expose the cylindrical inner surface and the selective transfer material; or
      an exterior layer directly coupled to the cylindrical outer surface and exteriorly covering the cylindrical outer surface and the selective transfer material, wherein the exterior layer is configured to wear away, during an initial period of use of the bearing, to expose the cylindrical outer surface and the selective transfer material.

2. The bearing according to claim 1, wherein the metallic base material comprises a bronze alloy.

3. The bearing according to claim 1, wherein the selective transfer material is selected from the group consisting of tin, zinc, copper, iron, lead, palladium, cobalt, titanium dioxide, copper oxide, iron oxide black (Fe3O4), zinc oxide, aluminum oxide, zinc dialkyl dithiophosphate (ZDDP), molybdenum disulfide, graphene, Si3N4, AlN, CaCO3, MgO, and serpentine minerals.

4. The bearing according to claim 3, wherein the serpentine minerals comprise Mg6Si4O10(OH)8, $Al_2O_3$, CaO, and Fe2O3.

5. The bearing according to claim 1, wherein the selective transfer material comprises particles each having a maximum dimension that is less than or equal to 40 nanometers.

6. The bearing according to claim 1, wherein the selective transfer material has a percent composition between 1% and 10% of a combined mass of the base and the selective transfer material.

7. The bearing according to claim 1, wherein:
   when the bearing further comprises the interior layer, the interior layer is made of copper; and
   when the bearing further comprises the exterior layer, the exterior layer is made of copper.

8. The bearing according to claim 1, wherein:
   when the bearing further comprises the interior layer, the interior layer has a thickness less than or equal to 0.03 millimeters; and
   when the bearing further comprises the exterior layer, the exterior layer has a thickness less than or equal to 0.03 millimeters.

9. The bearing according to claim 1, wherein the base further comprises one of:

at least one recess formed in the cylindrical outer surface of the base, wherein the selective transfer material is contained within the at least one recess formed in the cylindrical outer surface; or at least one recess formed in the cylindrical inner surface of the base, wherein the selective transfer material is contained within the at least one recess formed in the cylindrical inner surface.

10. The bearing according to claim 9, wherein:
the at least one recess formed in the cylindrical outer surface forms a continuous ring that is perpendicular to a central axis of the central channel; and
the at least one recess formed in the cylindrical inner surface forms a continuous ring that is perpendicular to the central axis of the central channel.

11. The bearing according to claim 9, wherein:
the at least one recess formed in the cylindrical outer surface is non-continuous and entirely surrounded by the cylindrical outer surface; and
the at least one recess formed in the cylindrical inner surface is non-continuous and entirely surrounded by the cylindrical inner surface.

12. The bearing according to claim 9, wherein the base comprises one of:
a plurality of recesses formed in the cylindrical outer surface of the base, wherein each one of the plurality of recesses formed in the cylindrical outer surface passes through and is angled relative to at least another one of the plurality of recesses formed in the cylindrical outer surface; or
a plurality of recesses formed in the cylindrical inner surface of the base, wherein each one of the plurality of recesses formed in the cylindrical inner surface passes through and is angled relative to at least another one of the plurality of recesses formed in the cylindrical inner surface.

13. The bearing according to claim 9, wherein:
the at least one recess formed in the cylindrical outer surface forms a helix; and
the at least one recess formed in the cylindrical inner surface forms a helix.

14. The bearing according to claim 1, wherein the selective transfer material is uniformly distributed throughout the base.

15. A method of making a bearing, the method comprising:
forming a base made of a metallic base material and comprising a cylindrical outer surface, a cylindrical inner surface that is opposite the cylindrical outer surface, and a central channel that is defined by the cylindrical inner surface and extends through the base; and
embedding a selective transfer material into the base, wherein the selective transfer material is selected from the group consisting of tin, zinc, copper, iron, lead, palladium, cobalt, titanium dioxide, copper oxide, iron oxide black (Fe3O4), zinc oxide, aluminum oxide, zinc dialkyl dithiophosphate (ZDDP), molybdenum disulfide, graphene, Si3N4, AlN, CaCO3, MgO, and serpentine minerals; and one of:
directly coupling an interior layer to the cylindrical inner surface and interiorly covering the cylindrical inner surface and the selective transfer material, wherein the interior layer is configured to wear away, during an initial period of use of the bearing, to expose the cylindrical inner surface and the selective transfer material; or
directly coupling an exterior layer to the cylindrical outer surface and exteriorly covering the cylindrical outer surface and the selective transfer material, wherein the exterior layer is configured to wear away, during an initial period of use of the bearing, to expose the cylindrical outer surface and the selective transfer material;
wherein the selective transfer material is configured to release from the base in response to frictionally-induced pressure acting on the base and to bond to voids in one of the cylindrical outer surface or the cylindrical inner surface.

16. The method according to claim 15, wherein:
the step of forming the base comprises forming at least one recess into the cylindrical outer surface of the base or the cylindrical inner surface of the base; and
the step of embedding the selective transfer material comprises filling the at least one recess with the selective transfer material.

17. The method according to claim 15, wherein:
the step of forming the base and the step of embedding the selective transfer material occur simultaneously; and
the step of embedding the selective transfer material further comprises combining a second powder, made of the selective transfer material, to a first powder to form a powder mixture and compressing and sintering the powder mixture.

18. A bearing, comprising:
a base, made of a metallic base material and comprising:
a cylindrical outer surface;
a cylindrical inner surface that is opposite the cylindrical outer surface; and
a central channel defined by the cylindrical inner surface and extending through the base; and
a selective transfer material embedded in the base, wherein the selective transfer material is different than the metallic base material and comprises particles each having a maximum dimension that is less than or equal to 40 nanometers, wherein the selective transfer material is configured to release from the base in response to frictionally-induced pressure acting on the base and to bond to voids in one of the cylindrical outer surface or the cylindrical inner surface.

19. The bearing according to claim 18, wherein the metallic base material comprises a bronze alloy.

20. The bearing according to claim 18, wherein the selective transfer material is selected from the group consisting of tin, zinc, copper, iron, lead, palladium, cobalt, titanium dioxide, copper oxide, iron oxide black (Fe3O4), zinc oxide, aluminum oxide, zinc dialkyl dithiophosphate (ZDDP), molybdenum disulfide, graphene, Si3N4, AlN, CaCO3, MgO, and serpentine minerals.

* * * * *